US012190770B2

(12) United States Patent
Kim et al.

(10) Patent No.: US 12,190,770 B2
(45) Date of Patent: Jan. 7, 2025

(54) DISPLAY DRIVING CIRCUIT AND OPERATING METHOD OF THE SAME

(71) Applicant: Samsung Electronics Co., Ltd., Suwon-si (KR)

(72) Inventors: Sunyoung Kim, Suwon-si (KR); Joongmin Ra, Suwon-si (KR); Young Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/470,483

(22) Filed: Sep. 20, 2023

(65) Prior Publication Data

US 2024/0005831 A1 Jan. 4, 2024

Related U.S. Application Data

(63) Continuation of application No. 18/060,765, filed on Dec. 1, 2022, now Pat. No. 11,798,452.

(30) Foreign Application Priority Data

Dec. 3, 2021 (KR) ........................ 10-2021-0172268
Jun. 23, 2022 (KR) ........................ 10-2022-0077089

(51) Int. Cl.
*G09G 3/20* (2006.01)

(52) U.S. Cl.
CPC ......... *G09G 3/20* (2013.01); *G09G 2330/026* (2013.01); *G09G 2330/08* (2013.01); *G09G 2330/12* (2013.01)

(58) Field of Classification Search
CPC ......... G09G 2330/026; G09G 2330/08; G09G 2330/12; H04N 1/32625
See application file for complete search history.

(56) References Cited

U.S. PATENT DOCUMENTS

| | | | | |
|---|---|---|---|---|
| 8,589,906 | B2 | 11/2013 | Liu | |
| 8,674,928 | B2 | 3/2014 | Lee | |
| 8,890,877 | B2 | 11/2014 | Fu et al. | |
| 2009/0144455 | A1 | 6/2009 | Chen | |
| 2009/0249320 | A1 | 10/2009 | Su et al. | |
| 2015/0124391 | A1 | 5/2015 | Martinez et al. | |
| 2016/0118123 | A1 | 4/2016 | Jung et al. | |
| 2017/0220357 | A1 | 8/2017 | Choi et al. | |
| 2022/0005397 | A1 * | 1/2022 | Orio | H04N 9/30 |

FOREIGN PATENT DOCUMENTS

KR 101362145 B1 2/2014

OTHER PUBLICATIONS

Notice of Allowance dated Jun. 26, 2023 for corresponding U.S. Appl. No. 18/060,765.

* cited by examiner

*Primary Examiner* — Gerald Johnson
(74) *Attorney, Agent, or Firm* — Harness, Dickey & Pierce, P.L.C.

(57) ABSTRACT

A display driver circuit may include a revision controller for controlling a nonvolatile memory having instructions by which control data for controlling devices controlled by the display driver circuit are changed, and a drive controller for controlling the devices based on the instructions. The revision controller determines whether to perform a read operation to the instructions based on electrical power being applied to the display driver circuit, and transfers instruction signals, which are generated based on the determination to perform the read operation, to the driving controller.

20 Claims, 12 Drawing Sheets

DISPLAY DRIVING CIRCUIT AND OPERATING METHOD OF THE SAME

CROSS-REFERENCE TO RELATED APPLICATIONS

This is a continuation of U.S. non-provisional patent application Ser. No. 18/060,765, filed Dec. 1, 2022, which claims priority under 35 U.S.C. § 119 to Korean Patent Application Nos. 10-2021-0172268 filed on Dec. 3, 2021, and 10-2022-0077089 filed on Jun. 23, 2022, in the Korean Intellectual Property Office, the disclosures of which are incorporated by references herein in their entireties.

BACKGROUND

The inventive concepts relates to display driver circuits, and more particularly, to display driver circuits for driving a display panel for displaying images thereon and methods of operating display driver circuits.

A display device usually includes a display panel on which images are displayed and a display driver circuit (sometimes referred to as display driver integrated circuit) for driving the display panel. The display driver circuit receives image data from a host and transfers image signals corresponding to the received image data to data lines of the display panel, to thereby drive the display panel. The display driver integrated circuit controls the display panel, a power management integrated circuit (PMIC), and a touch integrated circuit.

After manufacturing the display driver integrated circuit, any defect correction to the display driver integrated circuit and the devices controlled by the display driver integrated circuit usually takes various time and requires high cost. Thus, there has been needed an improved method of easily supplementing the defect of the display driver integrated circuit and the units controlled by the display driver integrated circuit with less time and cost.

SUMMARY

The inventive concepts provides display driver circuits in which instructions for changing control data by which devices are controlled are stored in a nonvolatile memory in advance, and thus, the display driver circuit is operated by using the instructions that are read out from the nonvolatile memory, to thereby easily compensate for the defects of the display driver circuit, and methods of operating display driver circuits.

According to aspects of the inventive concepts, there is provided a display driver circuit including a revision controller configured to control a nonvolatile memory in which instructions are stored, and a drive controller configured to control devices based on the instructions. The instructions may change control data for controlling devices driven by the display driver circuit. The revision controller may determine whether to perform a read operation for reading out the instructions from the nonvolatile memory based on electrical power being applied to the display driver circuit from the outside, and may transfer instruction signals, which are generated based on the determination to perform the read operation, to the driving controller.

According to some other aspects of the inventive concepts, there is provided a display driver circuit including a revision controller configured to read out instructions from a first nonvolatile memory in which the instructions are stored, a second nonvolatile memory configured to store basic data for operating the display driver circuit, and a drive controller configured to control the devices driven by the display driver circuit based on at least one of the basic data and the instructions. The instructions may change control data for controlling the devices driven by the display driver circuit.

According to some other aspects of the inventive concepts, there is provided a method of operating a display driver circuit. At first, the display driver circuit may determine whether to perform a read operation for reading out instructions from a nonvolatile memory based on electrical power being applied to the display driver circuit. Then, the display driver circuit may determine whether the instructions are normal or abnormal. Thereafter, the display driver circuit may control the devices based on results of a step in which the instructions are determined as being normal or abnormal.

BRIEF DESCRIPTION OF THE DRAWINGS

Example embodiments will be more clearly understood from the following detailed description taken in conjunction with the accompanying drawings in which.

DETAILED DESCRIPTION

Hereinafter, one or more example embodiments of the inventive concepts will be described in detail with references to accompanying drawings.

Figure 1:
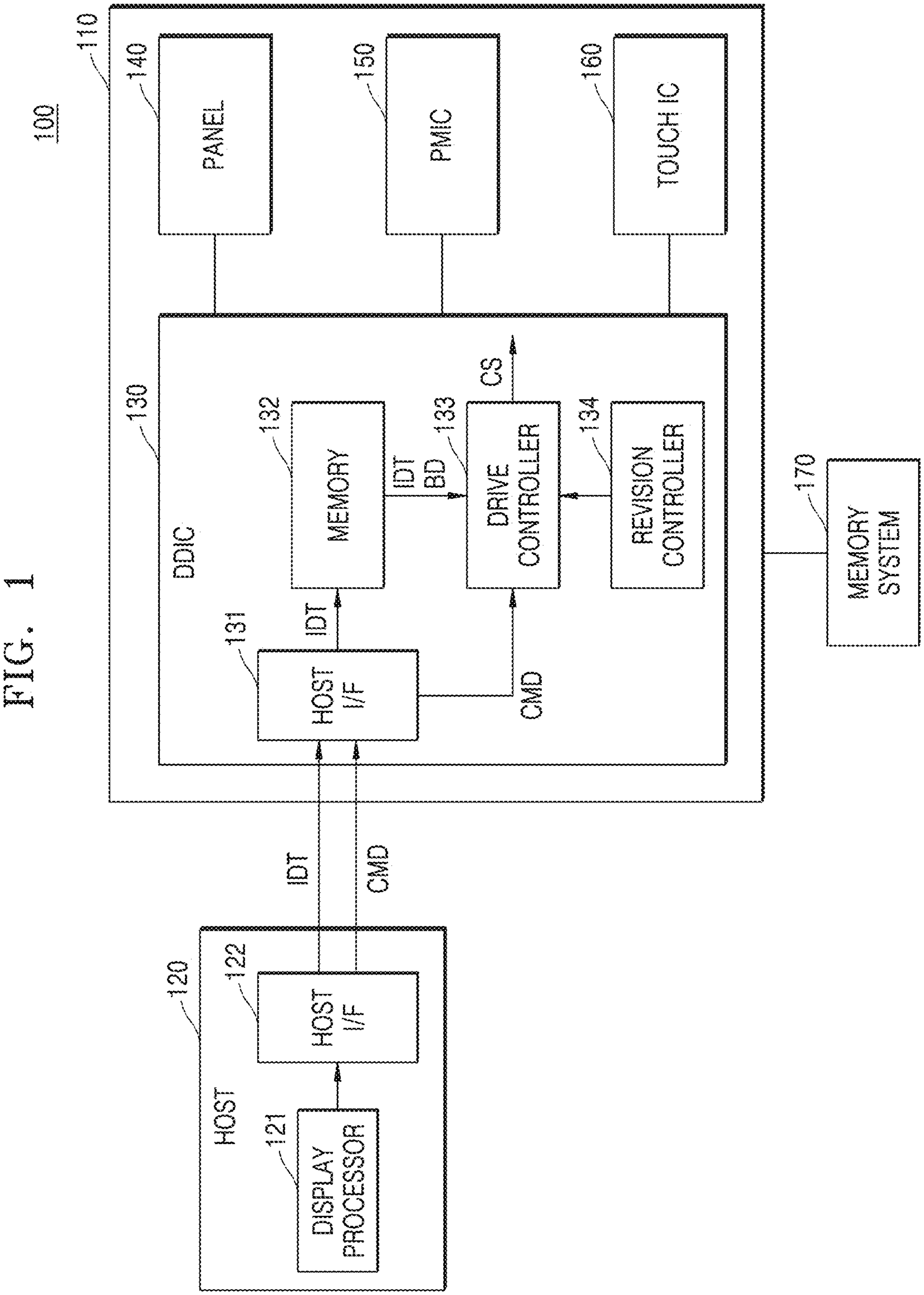
FIG. 1 is a block diagram showing a display system according to some example embodiments of the inventive concepts.

FIG. 1 is a block diagram showing a display system according to some example embodiments of the inventive concepts.

A display system 100 according to some example embodiments of the inventive concepts may be installed on electronic devices having functions of displaying images. In some example embodiments, the electronic device may include smartphones, tablet personal computers, portable multimedia players (PMP), cameras, wearable devices, Internet of Things devices, televisions, digital video disk (DVD) players, refrigerators, air conditioners, air purifiers, set-top boxes, robot drones, various medical devices, navigation devices, global positioning system (GPS) receivers, advanced drivers assistance systems (ADAS), vehicle devices, furniture, and/or various measuring devices.

Referring to FIG. 1, the display system 100 may include a host 120, a display driver circuit 130 (or display driver integrated circuit), a memory system 170, and a display panel 140. In some example embodiments, the display driver circuit 130 and the display panel 140 may be configured as a single module that is referred to as a display device 110. In some example embodiments, the display driver circuit 130 may be mounted on a circuit film, such as a tape carrier package (TCP), a chip-on-film (COF), and a flexible print circuit (FPC). The display driver circuit 130 may be adhered to the display panel 140 by a tape automatic bonding (TAB) process, or may be mounted on a non-display area of the display panel 140 by a chip-on-glass (COG) process or a chip-on-plastic (COP) process.

According to some example embodiments, the display driver circuit 130 may control at least one of the display panel 140, a power management integrated circuit (PMIC) 150, and a touch integrated circuit 160. However, the unit or devices controlled by the display driver circuit 130 should not be construed as limited to the above categories. If necessary, at least one of the PMIC 150 and the touch integrated circuit 160 may be omitted from the display system 100. The display driver circuit 130, the display panel 140, the PMIC 150, and the touch integrated circuit 160 may be configured to a single module.

The host 120 may control the overall operation of the display system 100. The host 120 may generate image data IDT that is to be displayed on the display panel 140, and may transfer the image data IDT and various command signals CMD, such as a driver initiating signal to the display driver circuit 130. In some example embodiments, the command signal CMD may include various setting information with regard to luminance, a gamma correction, a frame frequency, and/or an operation mode of the display driver circuit 130. A display processor 121 may transfer a clock signal or a synchronization signal to the display driver circuit 130. The image data IDT and the command signals CMD are illustrated as individual signals separated from each other, in FIG. 1, which should not be construed as limited to the transfer mode of the image data IDT and the command signals CMD. In some example embodiments, the image data IDT and the command signals CMD may be transferred to the display driver circuit 130 as a single signal packet and then may be separated into each signal in a host interface 131 of the display driver circuit 130.

In some example embodiments, the host 120 may include an application processor. However, the host 120 should not be construed as limited to the application processor. The host 120 may include various processors, such as a central processing unit (CPU), a microprocessor, a multimedia processor, and/or a graphics processor. In some example embodiments, the host 120 may be embodied as an integrated circuit (IC), and may be embodied as an application processor (AP) or a system on chip (SoC).

The host 120 may include a display processor 121 and an interface circuit 122. The display processor 121 may control the operation of the display device 110. The display processor 121 may transfer the image data IDT, which is to be displayed on the display device 110, and the command signals CMD, which control the operation of the display device 110, to the display device 110 through the interface circuit 122. In some example embodiments, when turned on by external electrical power, the display driver circuit 130 may receive the command signals CMD from the host 120.

The display driver circuit 130 may convert the image data IDT transferred from the host 120 into image signals by which the display panel 140 may work, and may transfer the image data to the display panel 140, to thereby display an image on the display panel 140.

The display driver circuit 130 may control various devices in response to the command signals CMD transferred from the host 120. In some example embodiments, the display driver circuit 130 may initiate the operation of the devices in response to the command signals CMD. In some example embodiments, the display driver circuit 130 may control the display panel 140 to display an image based on the command signals CMD.

The display driver circuit 130 may include a host interface 131, a memory 132, and a drive controller 133. The display driver circuit 130 may receive the image data IDT and the command signals CMD from the host 120 through the host interface 131. In some example embodiments, the interface circuit 122 of the host 120 and the host interface 131 of the display driver circuit 130 may be configured to one of serial interfaces such as a mobile industry processor interface (MIPI®)), a mobile display digital interface (MDDI), a display port, and an embedded display port (eDP).

The memory 132 may store the image data IDT transferred through the host interface 131, and may transfer the image data IDT to the drive controller 133. In some example embodiments, the image data IDT may be transferred to the drive controller 133 without being stored in the memory 132.

The memory 132 may store basic data BD for driving the display driver circuit 130. In some example embodiments, the basic data BD may include a driving frequency and a driving voltage level of the display driver circuit 130, and performance information of the host interface 131. In some example embodiments, the image data IDT may not be stored in the memory 132, and the basic data BD may be stored in the memory 132.

The memory 132 may include a one-time programmable (OTP) memory, a non-volatile memory, such as an electrically erasable programmable read-only memory (EEPROM), a flash memory, a phase-change random access memory (PRAM), a resistance random access memory (RRAM), a nano floating gate memory (NFGM), a polymer random access memory (PoRAM), a magnetic random access memory (MRAM), and a ferroelectric random access memory (FRAM). However, the memory 132 should not be construed as limited to the memories described above.

The drive controller 133 may receive the image data IDT, the command signals CMD, and the basic data BD, and may generate various control signals CS for controlling devices that may be controlled by the display driver circuit 130. In some example embodiments, the display driver circuit 130 may include a driver (not shown), and the driver may apply voltages to the gate lines and the data lines of the display panel 140 in response to the control signals CS. The touch integrated circuit 160 and the PMIC 150 may be controlled based on the control signals CS. In some example embodiments, the drive controller 133 may transfer the control signals CS to the PMIC 150 in such a way that voltages may be transferred to the display driver circuit 130 and the display panel 140 based on the command signals CMD and the basic data BD.

The display panel 140 may be a display portion on which the images are actually displayed, and may include any one of a thin film transistor-liquid crystal display (TFT-LCD) panel, an organic light emitting diode (OLED) panel, a field emission display panel, and a plasma display panel (PDP). The image signals may be electrically transferred to the display panel 140 and may be displayed on the display panel 140 as a 2-dimensional image. The display panel 140 may include any other flat display panels or flexible display panels.

The PMIC 150 may be connected to an external power and operated. In some example embodiments, the PMIC 150 may be connected to an electrical battery (not shown) and operated. The PMIC 150 may be provided as a single package together with the display driver circuit 130, which should not be construed as limited to the structures of the PMIC 150. The PMIC 150 may be individually separated from the display driver circuit 130. The PMIC 150 may apply voltages to the display driver circuit 130 or the display panel 140. The PMIC 150 may receive the control signals CS, and apply voltages to the display driver circuit 130 and the display panel 140 based on the control signals CS. In some example embodiments, the PMIC 150 may control the voltage level that may be applied to the display panel 140 based on the control signals CS.

The touch integrated circuit 160 may drive and control a touch panel (not shown). The touch integrated circuit 160 may receive the control signals CS, and may be operated based on the control signals CS.

The display system 100 may include the memory system 170. The memory system 170 may include a nonvolatile memory device in which various instructions for changing control data may be stored. The control data may control devices controlled by the display driver circuit 130. The instructions may include various data and command signals for changing the control data. In some example embodiments, the instructions may include various data and command signals for correcting defects of the devices.

The display driver circuit 130 may include the revision controller 134. The revision controller 134 may control the memory system 170. In some example embodiments, the revision controller 134 may control the nonvolatile memory in which the instructions are stored. The revision controller 134 may determine whether to perform a read operation for reading out the instructions from the memory system 170. When determining to perform the read operation, the revision controller 134 may transfer the instructions to the drive controller 133. In addition, the revision controller 134 may also control the drive controller 133 to read out the instructions.

The drive controller 133 may control the devices based on the instructions. The drive controller 133 may receive the instructions from the revision controller 134, or may read out the instructions. The drive controller 133 may generate the control signals CS reflecting the instructions. In some example embodiments, the instructions may include various data and command signals for correcting the luminance of the display panel 140, and the drive controller 133 may generate the control signals CS for correcting the luminance of the display panel 140 based on the instructions. Hereinafter, the revision controller is described in detail with reference to FIG. 2.

Figure 2:
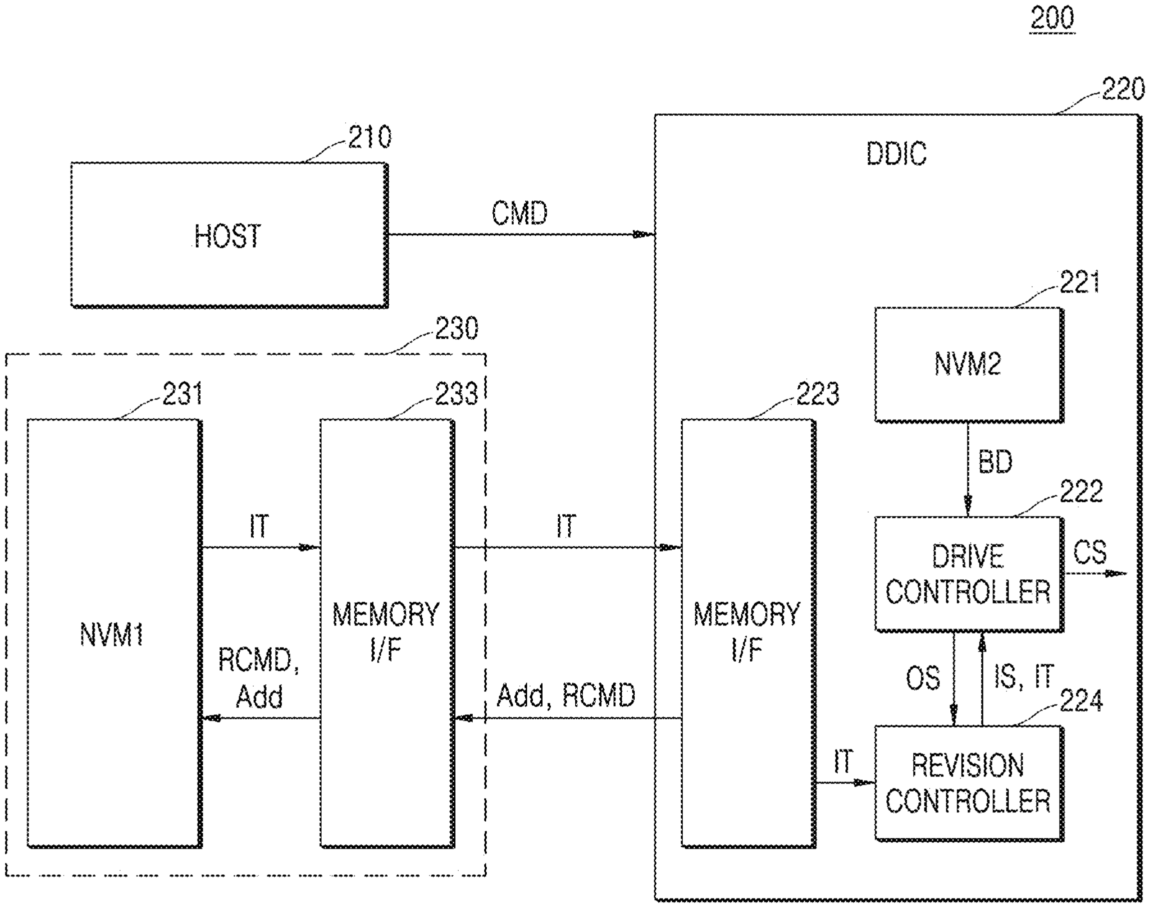
FIG. 2 is a block diagram showing a revision controller according to some example embodiments of the inventive concepts.

FIG. 2 is a block diagram showing the revision controller according to some example embodiments of the inventive concepts. A display system 200, a host 210, a display driver circuit 220, a second nonvolatile memory 221, a drive controller 222, a revision controller 224, and a memory system 230 in FIG. 2 may have substantially the same configurations as the display system 100, the host 120, the display driver circuit 130, the memory device 132, the drive controller 133, the revision controller 134, and the memory system 170 in FIG. 1, respectively. Thus, any further detailed descriptions on the corresponding elements are omitted.

Referring to FIG. 2, the memory system 230 may include a first nonvolatile memory device 231 and an interface circuit 233. The first nonvolatile memory device 231 may include a non-volatile memory, such as an EEPROM, a flash memory, a PRAM, a RRAM, an NFGM, a PoRAM, a MRAM, and an FRAM. However, the first nonvolatile memory device 231 should not be construed as limited to the memories described above.

The instructions IT may be stored in the first nonvolatile memory device 231. For changing the control data, the instructions IT may be stored in the first nonvolatile memory device 231. In some example embodiments, once the display driver circuit 220 is manufactured, a circuit test may be performed to the display driver circuit 220 for detecting defects therein. When a defect is found in the circuit test, the instructions IT for correcting the defect may be stored in the first nonvolatile memory 231. In some example embodiments, the instructions IT may include at least some of the command signals CMD transferred to the display driver circuit 220 from the host 210, some of the basic data stored in the second nonvolatile memory 221 that is to be changed, and data for correcting the devices controlled by the display driver circuit 220.

The memory system 230 may include the interface circuit 233. The first nonvolatile memory 231 may transfer the instructions IT to the display driver circuit 220 through the interface circuit 233. In addition, the first nonvolatile memory 231 may also transfer some (or, for example, all of) of the data, which is stored in the first nonvolatile memory 231 and required for driving the display driver circuit 220, to the display driver circuit 220 through the interface circuit 233.

The display driver circuit 220 may include a second nonvolatile memory 221, a drive controller 222, a revision controller 224, and a memory interface 223. While the revision controller 224 is illustrated to be embodied as a single integrated circuit together with the drive controller 222 in FIG. 2, the revision controller 224 should be not be construed as limited to the structures in FIG. 2. In some example embodiments, the revision controller 224 and the drive controller 222 may be embodied as an individual integrated circuit, respectively. In addition, the display driver circuit 220 may include the first nonvolatile memory 231 depending on some example embodiments.

The revision controller 224 may determine whether to perform the read operation for reading out the instructions IT from the first nonvolatile memory 231 once electrical power is applied to the display driver circuit 220 from an outside. In some example embodiments, once the electrical power is applied to the display driver circuit 220 from the outside, the revision controller 224 may determine whether to perform the read operation. In some example embodiments, the electrical power may be applied to the display driver circuit 220 from a PMIC (for example, the PMIC 150 in FIG. 1), and the revision controller 224 may determine whether to perform the read operation once the electrical power is applied to the revision controller from the PMIC.

In some example embodiments, once the electrical power is applied to the display driver circuit 220, the drive controller 222 may generate operating signals OS. The operating signals OS may indicate that the electrical power is applied to the drive controller 222. The drive controller 222 may transfer the operating signals OS to the revision controller 224. The revision controller 224 may determine whether or not the read operation is performed based on the operating signals OS. In some example embodiments, the electrical power may be applied to the display driver circuit 220 from the PMIC (for example, the PMIC 150 in FIG. 1), and the drive controller 222 may generate the operating signals OS based on the electrical power that is applied from the PMIC. Once receiving the operating signals OS, the revision controller 224 may determine whether to perform the read operation.

When receiving the operating signals OS, the revision controller 224 may determine whether to perform the read operation. The revision controller 224 may determine whether or not the instructions IT are stored in the first nonvolatile memory device 231. When the control data does not need to be changed, the instructions IT may not be stored in the first nonvolatile memory 231. In some example embodiments, when no defects are found in the devices controlled by the display driver circuit 220 in the circuit test, the instructions IT may not be stored in the first nonvolatile memory 231. When the instructions IT are not stored in the first nonvolatile memory 231, the revision controller 224 may not read out the instructions IT.

When the instructions IT are determined as being stored in the first nonvolatile memory 231, the revision controller 224 may perform the read operation for reading out the instructions IT. When the instructions IT are determined as not being stored in the first nonvolatile memory 231, the revision controller 224 may stop the read operation. That is, the revision controller 224 may not read out the instructions IT. The performing the read operation from the first nonvolatile memory 231 by the revision controller 224 may indicate that the revision controller 224 may control the first nonvolatile memory 231 to perform the read operation. In some example embodiments, the revision controller 224 may control the first nonvolatile memory 231 to read out the instructions IT by transferring physical addresses Add and read command signals RCMD to the first nonvolatile memory 231.

The revision controller 224 may determine whether or not the instructions IT may be stored in the first nonvolatile memory 231 by key data comparison. The revision controller 224 may compare first key data to second key data. The first key data for determining whether to perform the read operation may be stored in the first nonvolatile memory 231. When the instructions are stored in the first nonvolatile memory 231, the first key data may be stored together with the instructions IT. Thus, the first key data in the first nonvolatile memory 231 may indicate that the instructions IT are surely stored in the nonvolatile memory 231. The first key data may be stored in a particularly pointed address of the first nonvolatile memory 231, and the revision controller 224 may read out the first key data from the pointed address. The second key data may include a key data that may have already been set up in the revision controller 224.

When the first key data and the second key data match each other, the revision controller 224 may recognize that the instructions IT may be stored in the first nonvolatile memory 231, and then may perform the read operation.

When the first key data and the second key data do not match each other, the revision controller 224 may recognize that the instructions IT may not be stored in the first nonvolatile memory 231, and then may not perform the read operation.

In some example embodiments, the revision controller 224 may determine the instructions IT stored in the first nonvolatile memory 231 to be normal or abnormal. By determining errors from the instructions IT, the display driver circuit 220 may be prevented from being operated based on the erroneous instructions IT (or, for example, the chance of being operation based on erroneous instructions IT may be reduced), to thereby prevent or reduce the defects from the devices controlled by the display driver circuit 220. Once determining to perform the read operation for reading out the instructions IT from the first nonvolatile memory 231, the revision controller 224 may determine the instructions IT to be normal or abnormal. That is, when recognizing that the instructions IT are stored in the first nonvolatile memory 231, the revision controller 224 may read out the instructions IT and determine the read-out instructions IT to be normal or abnormal. In some example embodiments, the revision controller 224 may determine the instructions IT to be normal or abnormal based on the checksum of the read-out instruction IT. The checksum is described in detail hereinafter with references to FIG. 4 and FIG. 5.

When the instructions IT stored in the first nonvolatile memory 231 may be determined as being normal, the revision controller 224 may generate instruction signals IS. When the instructions IT stored in the first nonvolatile memory 231 are determined as being abnormal, the revision controller 224 may not generate the instruction signals IS. The instruction signals IS may indicate various signals by which the drive controller 222 controls the devices based on the instructions IT.

The drive controller 222 may receive the instructions IT, and may generate the control signals CS reflecting the instructions IT. The revision controller 224 may be embodied in such a way that the revision controller 224 transfers the instruction signals IS and the instructions IT to the drive controller 222. However, some example embodiments described above of the revision controller 224 should not be construed as limited to the revision controller. In some example embodiments, the drive controller 222 may be embodied in such a way that the drive controller 222 may perform the read operation when the drive controller 222 receives the instruction signals IS.

The drive controller 222 may generate the control signals CS based on at least any one of the command signals CMD, the instruction signals IS, and the basic data BD. In some example embodiments, the drive controller 222 may generate the control signals CS for driving a display panel (for example, the display panel 140 in FIG. 1) based on the command signals CMD, the instruction signals IS, and the basic data BD.

The display driver circuit 220 may include the memory interface 223. The display driver circuit 220 may receive the instructions IT through the interface circuit 233. In some example embodiments, the revision controller 224 may receive the instructions IT through the memory interface 223. The display driver circuit 220 may transfer the address Add and the read command signal RCMD through the memory interface 223. In some example embodiments, the revision controller 224 may transfer the address Add and the read command signal RCMD to the first nonvolatile memory 231 through the memory interface 223.

The first nonvolatile memory 231 may have storage capacity that is higher than the second nonvolatile memory 221. In some example embodiments, the first nonvolatile memory 231 may include a flash memory, and the second nonvolatile memory 221 may include an OTP memory. The OTP memory includes a plurality of OTP cells each of which is under a programmable state or a non-programmable state. Thus, data may be stored in each of the OTP cells. The OTP cell may be an irreversible cell in that the data programmed in the OTP cell may not be lost and thus the OTP cell may not be programmed when the electrical power is turned off. In some example embodiments, the OTP cell may include a fuse or an anti-fuse, and may be electrically programmed. The first nonvolatile memory 231 and the second nonvolatile memory 221 should not be construed as limited to the memories described above, and may include various kinds of the nonvolatile memories.

Figure 3:
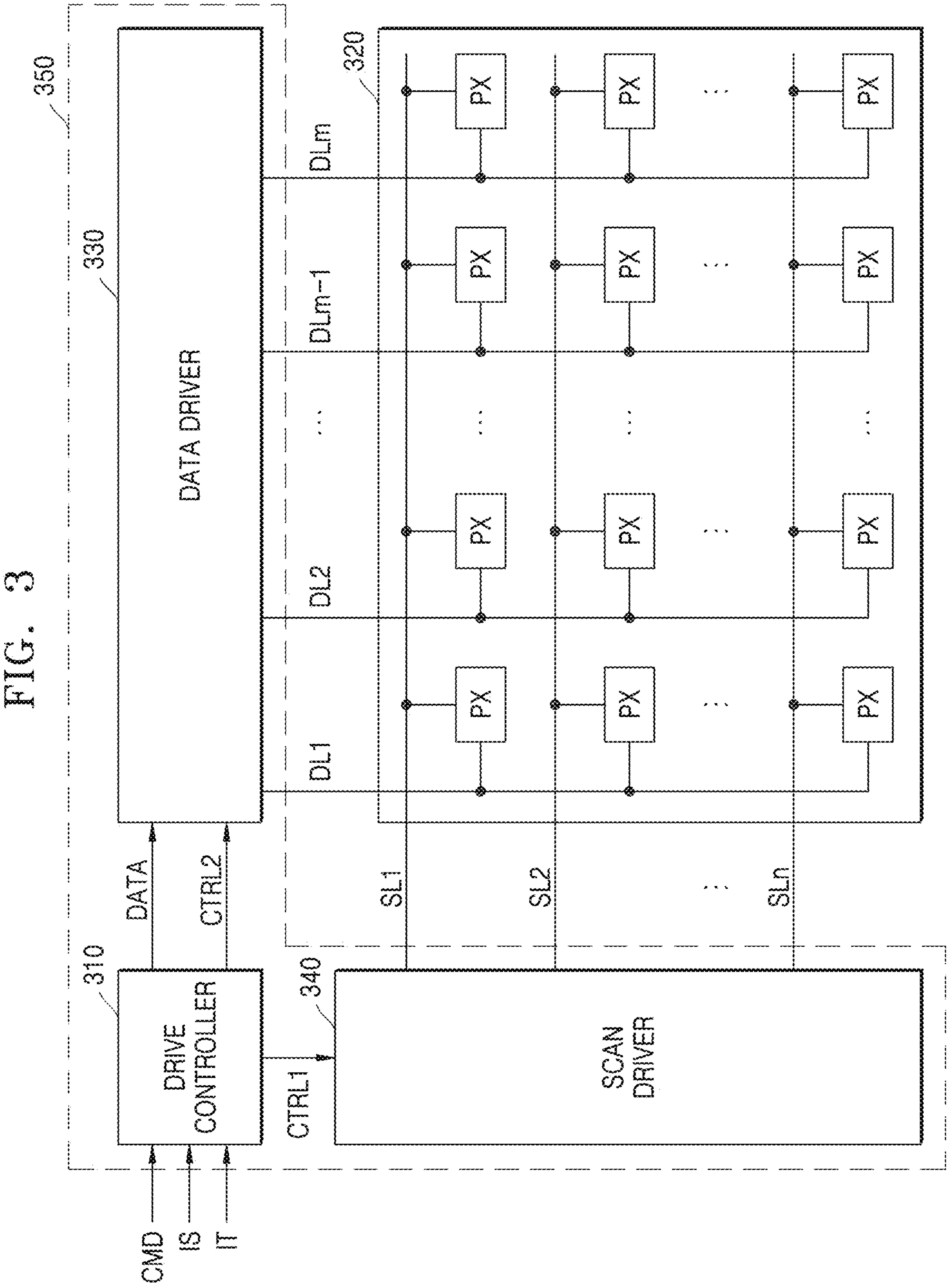
FIG. 3 is a block diagram showing a display device according to some example embodiments of the inventive concepts.

FIG. 3 is a block diagram showing a display device according to some example embodiments of the inventive concepts. A drive controller 310 and the display panel 320 in FIG. 3 corresponds to the drive controller 133 and the display panel 140 in FIG. 1, respectively.

Referring to FIG. 3, the display device may include a scan driver 340 and a data driver 330. However, a display driver circuit 350 may not include the scan driver 340, and the scan driver 340, for example, may be provided with the display device as an individual element separated from the display driver circuit 350.

The display panel 320 may include a plurality of pixels that may be arranged in a matrix form, and may display an image by the frame. The display panel 320 may include a plurality of scan lines SL1 to SLn that are arranged in a row direction, a plurality of data lines DL1 to DLm that are arranged in a column direction, and a plurality of the pixels PX that are at cross points of the scan lines SL1 to SLn and the data lines DL1 to DLm.

The drive controller 310 may generate the control signals CS based on at least any one of the command signals CMD, the instruction signals IS, and the instructions IT. The control signal may include at least one of a first control signal CTRL1 and a second control signal CTRL2. The first control signal CTRL1 may control the scan driver 340 and the second control signal CTRL2 may control the data driver 330.

The scan driver 340 may sequentially transfer scan-on signals to the scan lines SL1 to SLn in response to the first control signals CTRL1, and the scan lines SL1 to SLn may be sequentially selected. The scan lines SL1 to SLn may be sequentially selected in response to the scan-on signals that are transferred from the scan driver 340, and grayscale voltages may be applied to the pixels PX that are connected to the selected scan line through the data lines DL1 to DLm, to thereby perform the display operation. The grayscale voltages may include a plurality of values that are controlled based on the instructions IT. Scan-off signals (for example, scan voltages of logical high level) may be transferred to the scan lines SL1 to SLn when the scan-on signals are not transferred to the scan lines SL1 to SLn.

The data driver 330 may convert data DATA corresponding to the image data IDT into analog image signals in response to the second control signal CTRL2, and may transfer the analog image signals to the data lines DL1 to DLm. The data driver 330 may include a plurality of channel amplifiers that each transfer the image signals to at least one data line corresponding thereto.

The drive controller 310 may control the overall operation of the display panel 320. The drive controller 310 may be configured to one of hardware, software, and combinations thereof. In some example embodiments, the drive controller 310 may be embodied as digital logic circuits and resistors by which the following various functions are performed.

Figure 4:
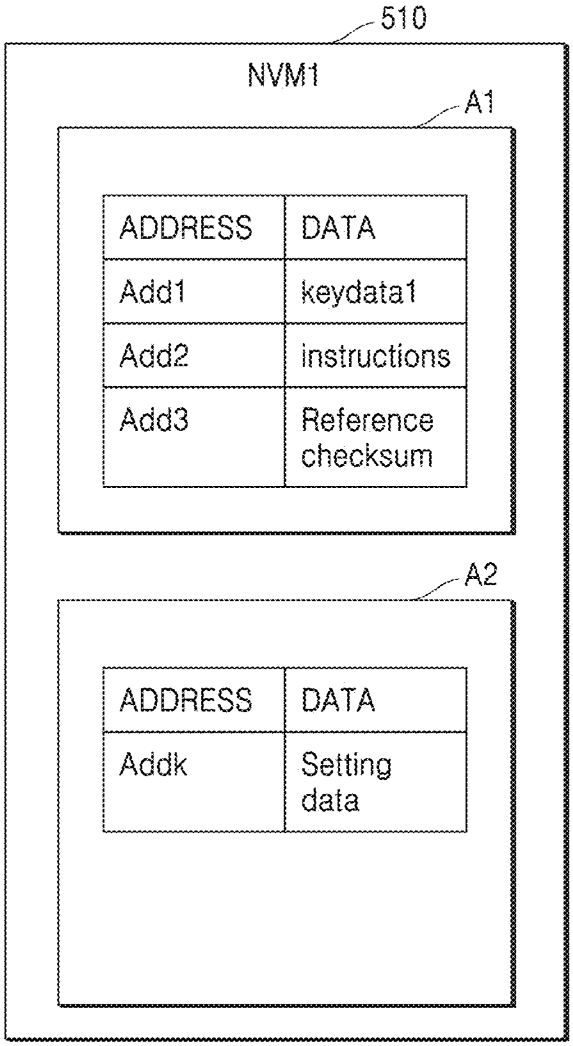
FIG. 4 is a view illustrating the instructions stored in a first nonvolatile memory, according to some example embodiments of the inventive concepts.

FIG. 4 is a view illustrating the instructions stored in the first nonvolatile memory according to some example embodiments of the inventive concepts. A first nonvolatile memory 510 in FIG. 4 may have substantially the same configurations as the first nonvolatile memory device 231 in FIG. 2. Thus, any further detailed descriptions on the corresponding element are omitted.

Referring to FIG. 4, the first nonvolatile memory 510 may include a plurality of areas. In some example embodiments, the first nonvolatile memory 510 may include a first area A1 and a second area A2. The instructions IT may be stored in the first area A1, and a plurality of setting data may be stored in the second area A2.

The first area A1 may include first to third addresses Add1 to Add3. Various pieces of data may be stored in different positions that are designated by the first to third addresses Add1 to Add3. In some example embodiments, the first key data keydata1 may be stored in the first address Add1, and the instructions IT may be stored in the second address Add2. The reference checksum may be stored in the third address Add3. The address may be an address of the first nonvolatile memory 510, and more particularly, be a system address that may be recognized by the revision controller (for example, the revision controller 224 in FIG. 2).

The instructions may include various data and command signals for changing control data for controlling the devices controlled by a display driver circuit (for example, the display driver circuit 220 in FIG. 2). All instructions for changing the control data for controlling the devices controlled by the display driver circuit may be stored in the first nonvolatile memory 510. In some example embodiments, the instructions for correcting all defects of the devices controlled by the display driver circuit may be stored in the first nonvolatile memory 510. In some example embodiments, when the defects may be found in the display panel and the PMIC controlled by the display driver circuit, the instructions corresponding to the defects may be stored at the position designated by the second address Add2. When a revision controller (for example, the revision controller 224 in FIG. 2) performs the read operation on the first nonvolatile memory 510, all instructions may be read out.

The instructions may include a booting command signal. The booting command signal may be a command signal requesting the display driver circuit get booted just like a command signal that a host (for example, the host 210 in FIG. 2) transfers to the display driver circuit for booting the display driver circuit. In performing the read operation to the first nonvolatile memory 510 by the revision controller, the booting command signal may be read out. The display driver circuit may perform the booting operation based on the booting command signal that is read out from the first nonvolatile memory 510. As the booting command signal is stored in the first nonvolatile memory 510 as one of the instructions, the display driver circuit may perform the booting operation based on the instructions without any receptions of the command signals from the host. Thus, it may take less time for the display driver circuit to perform the booting operation, and interface power for transferring the command signals between the host and the display driver circuit may be reduced.

In the case that the instructions are stored in the first nonvolatile memory 510, the first key data keydata1 may also be stored in the first nonvolatile memory 510. In some example embodiments, the first key data keydata1 may be stored in the first address Add1, and the instructions may be stored in the second address Add2. When the defect is not found in the circuit test after manufacturing the display driver circuit, the instructions may not be stored in the first nonvolatile memory 510. That is, in the case that the instructions are stored in the first nonvolatile memory 510, the first key data keydata1 may also be stored in the first nonvolatile memory 510. In contrast, in the case that the instructions are not stored in the first nonvolatile memory 510, the first key data keydata1 may not be stored in the first nonvolatile memory 510.

The first key data keydata1 may indicate data for determining whether or not the revision controller performs the read operation. It may be determined whether the revision controller may perform the read operation or not based on the first key data keydata1. In some example embodiments, the first key data keydata1 may be configured to be a size of 4 bytes, which should not be construed as limited to the size of the first key data keydata1.

The reference checksum may be stored in the first nonvolatile memory 510. The reference checksum may be a checksum value of the instructions that may be stored in the first nonvolatile memory 510. In some example embodiments, the checksum of the instructions stored in the second address Add2 may be stored in the third address Add3. In some example embodiments, the reference checksum may be a summation of all byte numbers of the instructions stored in the first nonvolatile memory 510.

The reference checksum may be used for detecting errors of the instructions that may be read out by the memory controller. The revision controller may determine the readout instructions to be a normal instruction or an abnormal instruction by comparing a checksum of the read-out instructions with the reference checksum stored in the first nonvolatile memory 510. A method of detecting the errors of the instructions by the revision controller is described in detail with reference to FIG. 5 hereinafter.

Setting data and the addresses may be stored in the second area A2. In some example embodiments, the setting data may be stored in a $k^{th}$ address Addk. The setting data may be various pieces of data for setting the display driver circuit and the devices driven by the display driver circuit. In some example embodiments, the setting data may include voltage information, luminance information, and offset calibration information of the display panel. However, the setting data should not be construed as limited to the information described above. Thus, the setting data may further include a voltage level and velocity information of the display driver circuit.

The revision controller may read out the setting data from the first nonvolatile memory 510. The revision controller may read out the data from the first area A1 of the first nonvolatile memory 510, and then may read out the data from the second area A2 of the first nonvolatile memory 510. In some example embodiments, the revision controller may read out the instructions, and then may read out the setting data from the first nonvolatile memory 510. The revision controller may read out the data of the first area A1 and the data of the second area A2 simultaneously from the first nonvolatile memory 510. In some example embodiments, the revision controller may read out the instructions and the setting data simultaneously from the first nonvolatile memory 510.

The revision controller may read out the setting data from the first nonvolatile memory 510, and may transfer the setting data to the driving controller. In addition, the drive controller may read out the setting data from the first nonvolatile memory 510. In some example embodiments, the drive controller may read out the data of the second area A2 from the first nonvolatile memory 510.

Figure 5:
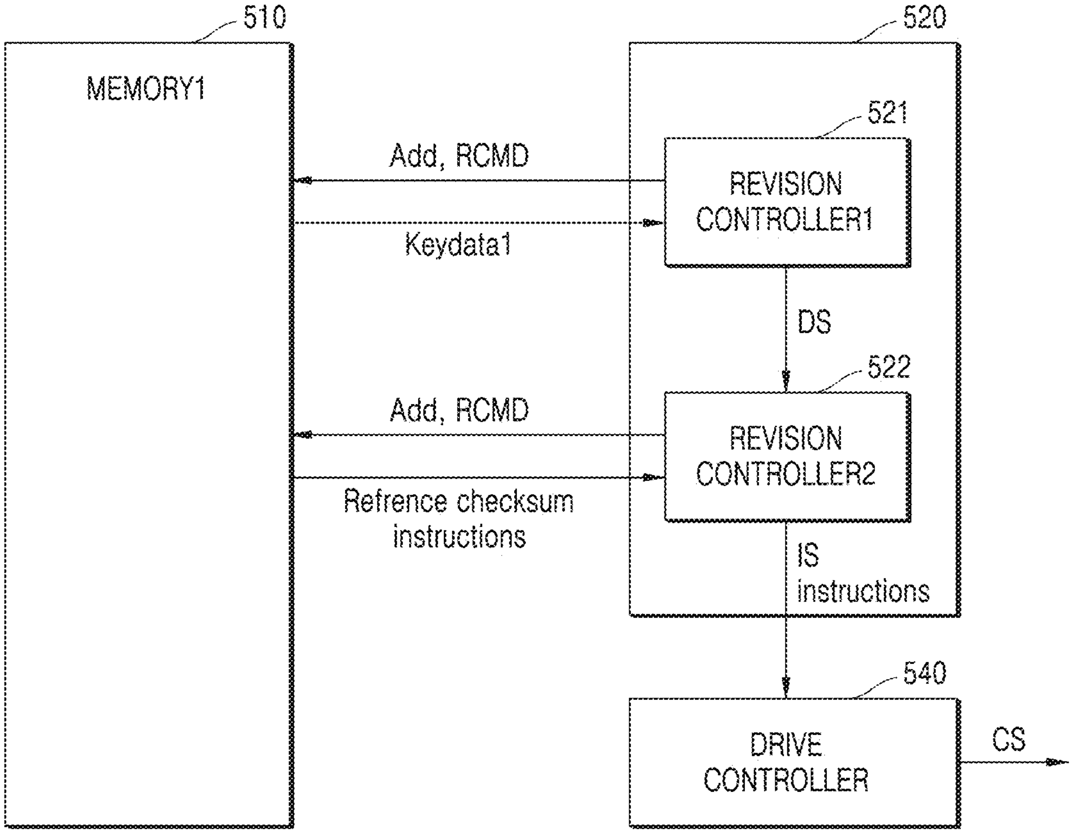
FIG. 5 is a block diagram showing a method of operating the revision controller, according some example embodiments of the inventive concepts.

FIG. 5 is a block diagram showing a method of operating the revision controller, according some example embodiments of the inventive concepts. A first nonvolatile memory device 510, a revision controller 520, and a drive controller 540 in FIG. 5 may correspond to the first nonvolatile memory device 510, the revision controller 520, and the drive controller 540 in FIG. 2, respectively. Thus, any further detailed descriptions on the corresponding elements are omitted. Hereinafter, the description on FIG. 5 is given together with FIG. 4.

Referring to FIG. 4 and FIG. 5, the revision controller 520 and the drive controller 540 may be provided as a single integrated circuit or as separated integrated circuits. According to some example embodiments, the first nonvolatile memory device 510 may be included in the display driver circuit.

The revision controller 520 may include a first revision controller 521 and a second revision controller 522. The first revision controller 521 may determine whether the read operation for reading the instructions from the first nonvolatile memory 510 may be performed or not.

The first revision controller 521 may determine whether or not the read operation may be performed by using the first key data keydata1 stored in the first nonvolatile memory 510. The first revision controller 521 may read out the first key data keydata1 by using the address. The first revision controller 521 may provide the corresponding address Add and the readout command signal RCMD to the first nonvolatile memory 510, and thus, the first revision controller 521 may control the first nonvolatile memory 510 to read out the first key data keydata1. In some example embodiments, the first revision controller 521 may control the first nonvolatile memory 510 to read out the first key data keydata1 stored in the first address Add1.

The first revision controller 521 may compare the first key data keydata1 to second key data. The second key data may include an encrypt pattern that is encrypted as a preset (or, alternatively, desired or selected) value, and may be stored in the first revision controller 521. When the first key data keydata1 and the second key data match with each other (referred to as key match), the first revision controller 521 may recognize that the read operation is performed. The key match between the first and second key data may indicate that the first key data and the second key data are completely identical and coincide with each other. However, the key match between the first and second key data may indicate that the first key data and the second key data are not identical to each other, and a value corresponding to the first key data may be the second key data, which should not be construed as limited to the key match between the first and second key data.

When recognizing the read operation, the first revision controller 521 may generate a discriminant signal DS. The first revision controller 521 may transfer the discriminant signal DS to the second revision controller 522. According to some example embodiments, when recognizing the read operation, the first revision controller 521 may control the second revision controller 522 to read out the instructions. The first revision controller 521 may transfer the discriminant signal DS to the second revision controller 522. When receiving the discriminant signal DS, the second revision controller 522 may read out the instructions from the first nonvolatile memory.

The second revision controller 522 is illustrated to read out the instructions in FIG. 5, which should not be construed as limited to the operation of the second revision controller 522. When recognizing the read operation, the first revision controller 521 may read out the instructions. The first revision controller 521 may transfer the instructions to the second revision controller 522. In some example embodiments, the first revision controller 521 may control the first nonvolatile memory 510 to read out the instructions by providing the second address Add2 and the readout command signal RCMD1 to the first nonvolatile memory 510. The first revision controller 521 may transfer the read-out instructions to the second revision controller 522.

When the first key data keydata1 is matched with the second key data with each other, the first revision controller 521 may read out the instructions from the first nonvolatile memory 510, or the second revision controller 522 may perform the read operation. In some example embodiments, when determining that the first key data keydata1 is identical to the second key data, the first revision controller 521 may transfer the discriminant signal DS to the second revision controller 522. Then, the second revision controller 522 may receive the discriminant signal DS and read out the instructions. Hereinafter, it is assumed that the second revision controller 522 reads out the instructions when the second revision controller 522 receives the discriminant signal DS.

In the case that the first key data keydata1 is not matched with the second key data, the first revision controller 521 may determine that the read operation is not performed. The first revision controller 521 may not read out the instructions from the first nonvolatile memory 510. When determining that the read operation is not performed, the first revision controller 521 may not generate the discriminant signal DS. The second revision controller 522 may not receive the discriminant signal DS from the first revision controller 521, and thus, the second revision controller 522 may not read out the instructions from the first nonvolatile memory 510.

The second revision controller 522 may determine that the instructions read out from the first nonvolatile memory 510 are normal or abnormal. The second revision controller 522 may receive the discriminant signal DS from the first revision controller 521. When receiving the discriminant signal DS, the second revision controller 522 may determine that the instructions, which are read out by the first revision controller 521, may be normal or abnormal.

When receiving the discriminant signal DS, the second revision controller 522 may read out the instructions from the first nonvolatile memory 510. In the case that the first revision controller 521 reads out the instructions, the second revision controller 522 may receive the instructions and the discriminant signal DS from the first revision controller 521.

The second revision controller 522 may determine whether to perform the read operation by using the reference checksum stored in the first nonvolatile memory 510. When receiving the discriminant signal DS from the first revision controller 521, the second revision controller 522 may read out the reference checksum and the instructions from the first nonvolatile memory 510.

The second revision controller 522 may read out the reference checksum and the instructions by using the addresses. The second revision controller 522 may provide the corresponding address Add and the readout command signal RCMD to the first nonvolatile memory 510, and thus, the second revision controller 522 may control the first nonvolatile memory 510 to read out the reference checksum and the instructions. In some example embodiments, the second revision controller 522 may control the first nonvolatile memory 510 to read out the instructions stored in the second address Add2 and read out the reference checksum stored in the third address Add3.

The second revision controller 522 may compare the reference checksum with a checksum of the read-out instructions. In some example embodiments, the second revision controller 522 may generate a reading checksum by calculating the checksum of each of the read-out instructions. When the reading checksum may be matched with the reference checksum (referred to as checksum match), the second revision controller 522 may determine the read-out instructions that may be read out from the first nonvolatile memory 510 to be normal. When the read-out instructions may be determined as being the normal instruction, the second revision controller 522 may generate instruction signals IS. The second revision controller 522 may transfer the instruction signals IS to the drive controller 540. The checksum match between the reading checksum and the reference checksum may indicate that the reading checksum and the reference checksum are identical to each other. However, the checksum match between the reading checksum and the reference checksum may indicate that the reading checksum and the reference checksum are not identical to each other, and a value corresponding to the reading checksum may be the reference checksum, which should not be construed as limited to the checksum match between the reading checksum and the reference checksum.

When the reading checksum and the reference checksum do not match with each other, the second revision controller 522 may determine the instruction, which is read out from the first nonvolatile memory 510, as the abnormal instruction. When the instruction is determined as being abnormal, the second revision controller 522 may not generate the instruction signals IS. The second revision controller 522 may detect the errors of the read-out instructions, and thus, the display driver circuit may be prevented from driving the devices based on the erroneous instructions (or, for example, the chance of being operation based on erroneous instructions may be reduced).

When receiving the instruction signals IS from the second revision controller 522, the drive controller 540 may control the devices based on the instructions. The drive controller 540 may receive the instructions from the second revision controller 522. The drive controller 540 may control the devices, based on the instruction signals IS and the instructions.

The drive controller 540 may also read out the instructions from the first nonvolatile memory 510. In some example embodiments, the drive controller 540 may control the first nonvolatile memory 510 to read out the instructions by providing the addresses and readout command signals to the first nonvolatile memory 510. When receiving the instruction signals IS, the drive controller 540 may control the device, based on the instructions and the basic data. When not receiving the instruction signals IS, the drive controller 540 may control the device based on the basic data.

In some example embodiments, the second revision controller 522 may be omitted as occasion demands. In the case that the second revision controller 522 is omitted, the first revision controller 521 may transfer the discriminant signal DS to the drive controller 540 as the instruction signal IS. The drive controller 540 may receive the instructions from the first revision controller 521. In addition, the drive controller 540 may read out the instructions from the first nonvolatile memory 510 based on the discriminant signal DS.

Figure 6:
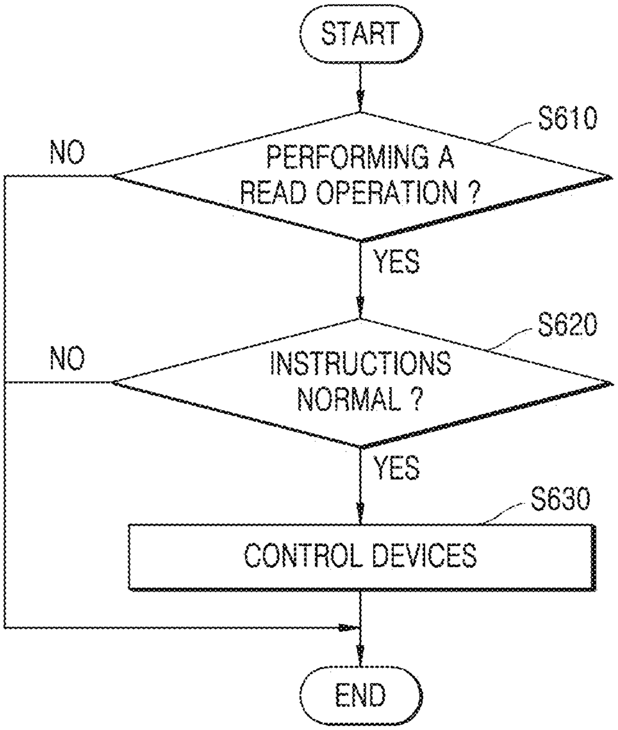
FIG. 6 is a flow chart showing a method of operating the revision controller, according to some example embodiments of the inventive concepts.

FIG. 6 is a flow chart showing a method of operating the revision controller, according to some example embodiments of the inventive concepts. Particularly, FIG. 6 is a flow chart showing a method of operating the display driver circuit 220 in FIG. 2. The same descriptions as given above are omitted.

In operation S610, the display driver circuit may determine whether or not the read operation may be performed. The display driver circuit may determine whether to perform the read operation for reading out the instructions from the first nonvolatile memory. Once electrical power is applied to the display driver circuit from the outside, the display driver circuit may determine whether to perform the read operation. When the read operation is determined as being performed in operation S610, operation S620 may be performed. When the read operation is determined as not being performed in operation S610, the operation of the display driver circuit may be stopped. That is, the display driver circuit may not read out the instructions.

In operation S620, the display driver circuit may determine whether the instructions are normal or abnormal. The display driver circuit may determine that the instructions, which are read out from the first nonvolatile memory, may be normal or abnormal. When the instructions are determined as being normal, the display driver circuit may perform operation S630. In some example embodiments, when the read-out instruction is normal, the display driver circuit may generate instruction signals.

When the read-out instruction is normal, in operation S630, the display driver circuit may control the devices. When the read-out instruction is normal, the display driver circuit may control the devices based on the instruction.

When the read-out instruction is abnormal, the display driver circuit may stop operating. That is, the display drive circuit may not generate the instruction signals. When the read-out instruction is abnormal, the display driver circuit may drive the devices without instructions. Operation S620 may be omitted depending on some example embodiments of the inventive concepts. That is, the display driver circuit may perform operation S630 after performing operation S610 without performing operation S620.

Figure 7:
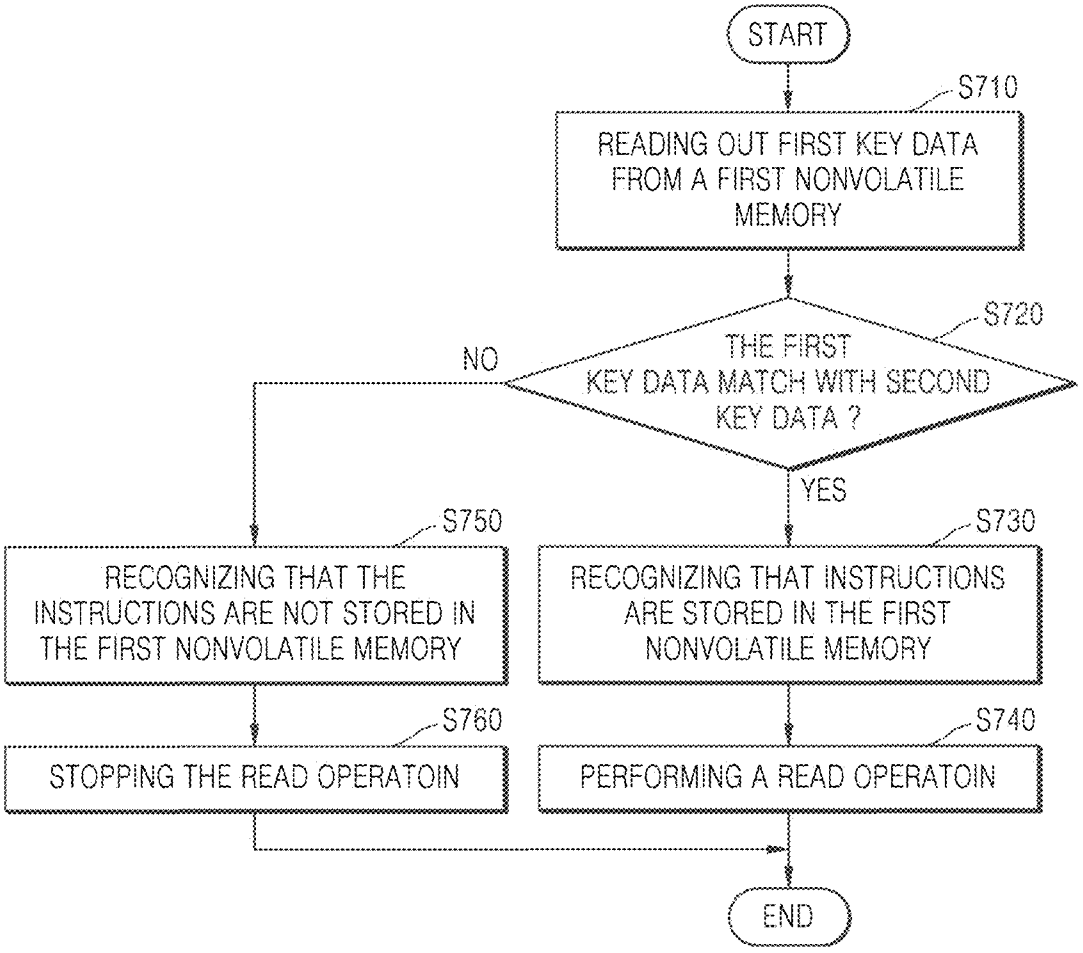
FIG. 7 is a flow chart showing a method of operating a first revision controller, according to some example embodiments of the inventive concepts.

FIG. 7 is a flow chart showing a method of operating the first revision controller, according to some example embodiments of the inventive concepts. FIG. 7 is a flow chart showing a method of operating the first revision controller 521 in FIG. 5. Particularly, FIG. 7 is a flow chart explaining operation S610 in FIG. 6. The same descriptions as given above are omitted.

The first revision controller may read out the first key data from the first nonvolatile memory in operation S710. The first revision controller may determine whether to perform the read operation by using the first key data stored in the first nonvolatile memory. The first revision controller may determine whether to perform the read operation based on whether the first key data may be stored in the first nonvolatile memory.

The first revision controller may determine whether the first key data may be matched with the second key data in operation S720. The first key data may include an encrypted pattern for determining whether or not the instructions may be stored in the first nonvolatile memory. When the instructions are stored in the first nonvolatile memory, the first key data may be stored in the first nonvolatile memory together with the instructions. The second key data may include a preset (or, alternatively, desired or selected) encrypt pattern in the first revision controller. When the first key data is matched with the second key data, the first revision controller may perform operation S730. When the first key data is not matched with the second key data, the first revision controller may perform operation S740.

The first revision controller may read out the first key data. The first revision controller may transfer the addresses and the read-out command signal to the first nonvolatile memory, and may control the first nonvolatile memory to read out the first key data. The first revision controller may compare the first key data, which is read out from the first nonvolatile memory, with the second key data, which has been already set in the first revision controller.

When the first key data is matched with the second key data, the first revision controller may recognize that the instructions are stored in the first nonvolatile memory in operation 730. When the instructions are stored in the first nonvolatile memory, the first revision controller may perform the read operation (S740). In some example embodiments, when the first key data is matched with the second key data, the first revision controller may recognize that the instructions are stored in the first nonvolatile memory, and then the first revision controller may read out the instructions from the first nonvolatile memory.

In some example embodiments, when completing operation S730, the first revision controller 521 may generate the discriminant signal and read out the instructions. The first revision controller may transfer the discriminant signal to the second revision controller. In operation S740, the first revision controller may perform the read operation. The first revision controller may transfer the instructions, which are read out from the first nonvolatile memory, to the second revision controller. However, the operation described above should not be construed as limited the operation of the second revision controller. In some example embodiments, operation S740 may be omitted when the second revision controller may be configured to perform the read operation. The second revision controller may read out the instructions in response to the discriminant signal transferred from the first revision controller.

In operation S750, the first revision controller may recognize that the instructions are not stored in the first nonvolatile memory. When recognizing that the instructions are not stored in the first nonvolatile memory, the first revision controller may stop the read operation (S760). In some example embodiments, when recognizing that the first key data and the second key data do not match each other, the first revision controller may determine that the instructions are not stored in the first nonvolatile memory, and may not read out the instructions from the first revision controller.

Figure 8:
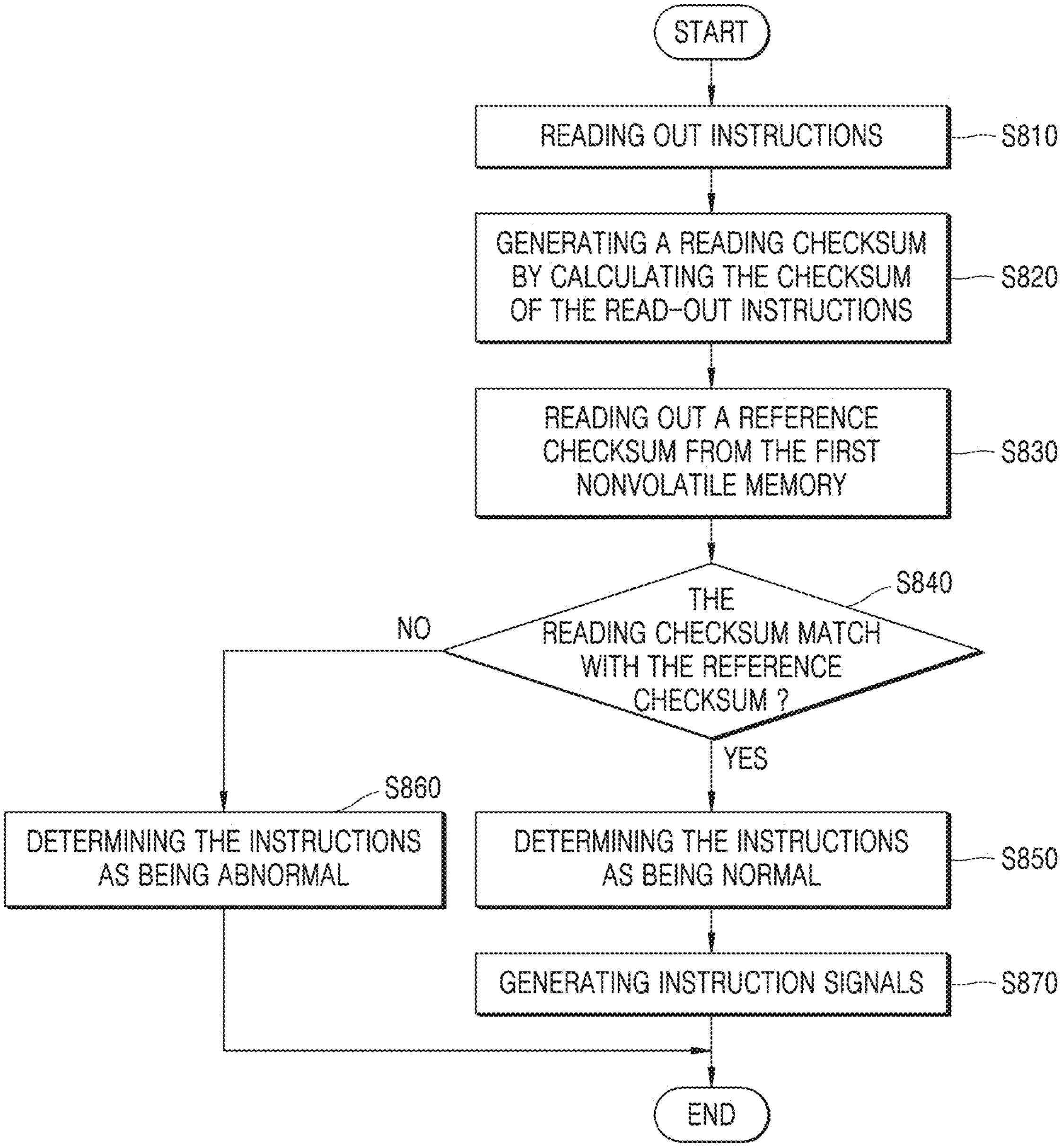
FIG. 8 is a flow chart showing a method of operating a second revision controller, according to some example embodiments of the inventive concepts.

FIG. 8 is a flow chart showing a method of operating the second revision controller, according to some example embodiments of the inventive concepts. FIG. 8 is a flow chart showing a method of operating the second revision controller 522 in FIG. 5. Particularly, FIG. 8 is a flow chart explaining operation S620 in FIG. 6. The steps in FIG. 8 may be conducted after the first revision controller may perform operation S730 in FIG. 7. The same descriptions as given above are omitted.

In operation S810, the second revision controller may read out the instructions from the first nonvolatile memory. In some example embodiments, the second revision controller may receive the discriminant signal from the first revision controller. The second revision controller may read out the instructions when the discriminant signal is received in the second revision controller. In some example embodiments, the instructions may be read out immediately when the discriminant signal is received in the second revision controller. In the case that the first revision controller reads out the instructions, and the second revision controller receives the instructions from the first revision controller, operation S810 may be omitted. In some example embodiments, the second revision controller may receive the instructions and the discriminant signal from the first revision controller. In addition, operation S830 may be performed after operation S810 is completed in FIG. 8, which should not be construed as limited to the operation of the second revision controller. In some example embodiments, operation S810 may be performed after operation S830 is completed, or operation S810 and operation S830 are simultaneously performed.

In operation S820, the second revision controller may generate a reading checksum by calculating the checksum of the instructions that are read out from the first nonvolatile memory. In operation S830, the second revision controller may read out the reference checksum from the first nonvolatile memory. In some example embodiments, the second revision controller may control the first nonvolatile memory to read out the reference checksum by transferring the addresses and the readout command signal to the first nonvolatile memory.

In operation S840, the second revision controller may determine whether or not the reading checksum matches the reference checksum. When the reading checksum matches the reference checksum, the second revision controller may determine the instructions, which may be read out from the first nonvolatile memory, as being normal (S850). In some example embodiments, when the reference checksum and the reading checksum are identical to each other, the second revision controller may determine the read-out instructions as being normal. When the read-out instructions are determined as being normal, the second revision controller may generate instruction signals (S870). The instruction signals may be transferred to a drive controller (for example, the drive controller 540 in FIG. 5). When receiving the instruction signals from the second revision controller, the drive controller may control devices controlled by the display driver circuit, based on the basic data and the instructions.

In operation S860, when the reading checksum does not match the reference checksum, the second revision controller may determine the instructions, which are read out from the first nonvolatile memory, as being abnormal. When the instructions read out from the first nonvolatile memory are determined as being abnormal, the second revision controller may stop operating. That is, when the read-out instructions are determined being abnormal, the second revision controller may not generate the instruction signals. In some example embodiments, when the reading checksum and the reference checksum are not identical to each other, the second revision controller may not generate the instruction signals. The instruction signals may not be transferred to the drive controller, and the drive controller may control the devices controlled by the display driver circuit, based on the basic data.

Figure 9:
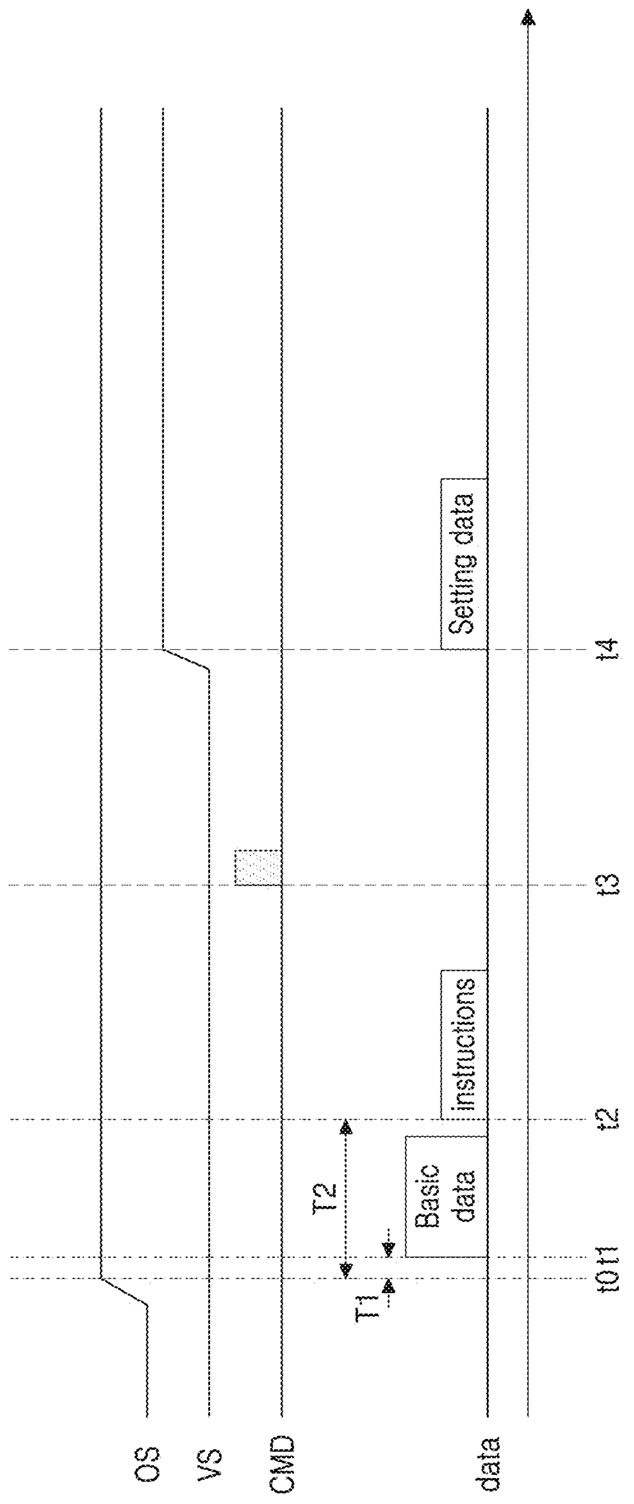
FIG. 9 is a timing chart showing operations of data and instructions relative to time, according to some example embodiments of the inventive concepts.

FIG. 9 to FIG. 12 are timing charts showing an operation of the display system, according to some example embodiments of the inventive concepts. FIG. 9 is a timing chart showing operations of the data and the instructions relative to time, according to some example embodiments of the inventive concepts.

Referring to FIG. 9, a power signal OS may indicate that electrical power may be applied to the display driver circuit. The power signal OS may include a signal indicating an electrical power signal applied to the display driver circuit. The power signal OS may be applied to the display driver circuit when the display driver circuit is initially operated or may be reset. The power signal OS may be applied to the revision controller. In some example embodiments, the drive controller may generate the power signal OS, and may transfer the power signal OS to the revision controller.

Once the electrical power is applied to the display driver circuit, the power signal OS may be changed from a state of a logically low level (referred to as low level) to a state of a logically high level (referred to as high level). In some example embodiments, the power signal OS may be changed from the low level to the high level at an initial time t0. However, the operation of the power signal OS should not be construed as limited to the operation described above. In another example, when electrical power is applied to the display driver circuit, the power signal OS may be changed from the high level to the low level.

Once the electrical power is applied to the display driver circuit, the drive controller may read out the basic data stored in the second nonvolatile memory. The basic data may indicate various fundamental operation signals for operating the display driver circuit. In some example embodiments, the basic data may include a driving frequency and a driving voltage level of the display driver circuit, and performance information of the host interface.

The drive controller may read out the basic data, based on the logic level change of the power signal OS. In some example embodiments, the drive controller may initiate the read operation for reading out the basic data in some time after the logic level of the power signal OS is changed. In some example embodiments, the drive controller may read out the basic data from the second nonvolatile memory at a first time t1 passing by a first time interval T1 from the initial time t0.

The drive controller may load the instructions stored in the first nonvolatile memory. The drive controller may read out the instructions stored in the first nonvolatile memory. In some example embodiments, the drive controller may receive the instructions from the revision controller, and load the instructions.

Once the electrical power is applied to the display driver circuit, the drive controller may load the instructions stored in the first nonvolatile memory. In some example embodiments, the drive controller may load the instructions, based on the logic level change of the power signal OS. The drive controller may perform a loading of the instructions in some time after the logic level of the power signal OS is changed. In some example embodiments, the drive controller may read out the instructions from the first nonvolatile memory at a second time t2 passing by a second time interval T2 from the initial time t0. The second time interval T2 may be longer than the first time interval T1.

The revision controller may be operated prior to the second time t2 at which the drive controller loads the instructions. The revision controller may determine whether to perform the read operation on the instructions, and may determine whether the instructions are normal or not, based on the power signal OS. The revision controller may determine whether to read out the instructions, based on the logic level change of the power signal OS. The revision controller may determine whether to perform the read operation, and whether the instructions may be normal or not after the initial time t0. However, the determination point of the revision controller should not be construed as the above description. In some example embodiments, the revision controller may determine whether to perform the read operation and whether the instruction may be normal or not at the second time passing by the second time interval T2 from the initial time t0. Furthermore, the drive controller may load the instructions after the second time t2.

When the revision controller determines to perform the read operation to read out the instructions, and determines that the instructions are normal, the drive controller may load the instructions.

The command signals CMD may be transferred to the display driver circuit from the host. The command signals may include various setting information with regard to luminance, gamma correction, a frame frequency, and/or an operation mode of the display driver circuit 130. In some example embodiments, the command signal CMD may include a panel start command for displaying an image on the display panel controlled by the display driver circuit. Hereinafter, the capital word CMD in FIG. 9 exemplarily indicates the panel start signal, and the following descriptions are given on the assumption that the capital word CMD in FIG. 9 indicate the panel start signal. The panel start signal CMD may be transferred to the drive controller after the drive controller loads the instructions. In some example embodiments, the panel start signal CMD may be transferred to the drive controller at a third time t3 after the second time t2. The drive controller may control the display panel to display the image data based on the panel start signal CMD. In some example embodiments, the drive controller may generate a control signal, based on the panel start signal CMD, and a voltage may be applied to the display panel, based on the control signal.

A voltage signal VS may be a signal of voltage that is applied to the display panel. The voltage signal VS may indicate electrical power or a voltage that is applied to the display panel. The logic level of the voltage signal VS may be changed, based on the panel start signal CMD. Once the logic level of the voltage signal VS is changed, the display panel may initiate the operation of the image display. When the voltage signal VS is changed from the low level to the high level, an image may be displayed on the display panel. In some example embodiments, the voltage signal VS may be changed from the low level to the high level at a fourth time t4.

The drive controller may load the setting data stored in the first nonvolatile memory. That is, the drive controller may read out the setting data from the first nonvolatile memory, or may receive the setting data that the revision controller reads out. The setting data may include various pieces of data for setting the display driver circuit and for setting the devices controlled by the display driver circuit. In some example embodiments, the setting data may include voltage information, luminance information, and/or offset calibration data of the display panel. However, the setting data should not be construed as limited to the substances described above. For example, the setting data may further include a voltage level and velocity information that work in the display driver circuit.

The drive controller may load the setting data, based on the logic level change of the voltage signal VS. The drive controller may initiate the operation of the setting data loading when the logic level of the voltage signal VS is changed. In some example embodiments, the drive controller may read out the setting data from the first nonvolatile memory at a fourth time t4. In some example embodiments, the revision controller may read out the setting data from the first nonvolatile memory at the fourth time t4, and the drive controller may receive the setting data from the revision controller.

The time when the drive controller loads the setting data coincides with the time when the logic level of the voltage signal VS is changed in FIG. 9, which should not be construed as limited to the loading time of the setting data. In some example embodiments, the logic level of the voltage signal VS may be changed after the drive controller loads the setting data. In some example embodiments, the drive controller may initiate the loading of the setting data in some time after the logic level of the voltage signal VS is changed.

Figure 10:
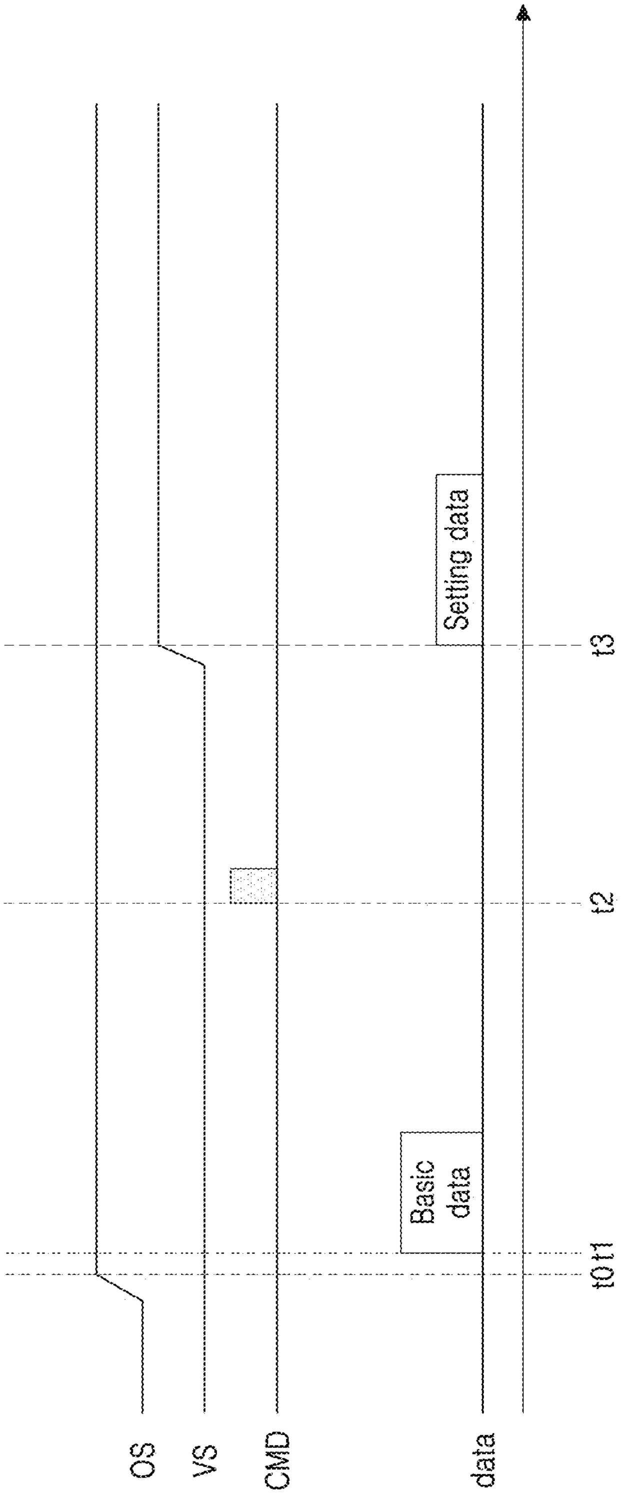
FIG. 10 is a timing chart showing operations of the data relative to time when the instructions are not stored in the first nonvolatile memory, according to some example embodiments of the inventive concepts.

FIG. 10 is a timing chart showing operations of the data relative to time when the instructions are not stored in the first nonvolatile memory, according to some example embodiments of the inventive concepts. The operations in FIG. 10 are substantially the same as the operations in FIG. 9, except that the instructions are not stored in the first nonvolatile memory. Thus, the detailed descriptions on the same operations are omitted.

Referring to FIG. 10, the drive controller may load the instructions stored in the first nonvolatile memory. The drive controller may read out the instructions stored in the first nonvolatile memory, or may receive the instructions from the revision controller, and load the instructions. The revision controller may be operated before the drive controller loads the instructions. The revision controller may determine whether to perform the read operation on the instructions, and may determine whether the instructions are normal or not, based on the power signal OS. The revision controller may determine whether to read out the instructions, based on the logic level change of the power signal OS. The revision controller may determine whether to perform the read operation, and whether the instructions are normal or not after the initial time t0.

When the revision controller determines not to perform the read operation on the instructions, and determines that the instructions are abnormal, the drive controller may not load the instructions. In some example embodiments, the drive controller may not load the instructions after the first time t1.

The command signals CMD may be transferred to the drive controller at the second time t2. The drive controller may control the display panel to display the image data, based on the command signal CMD.

The drive controller may load the setting data stored in the first nonvolatile memory. In some example embodiments, the drive controller may load the setting data from the first nonvolatile memory at the third time t3.

Figure 11:
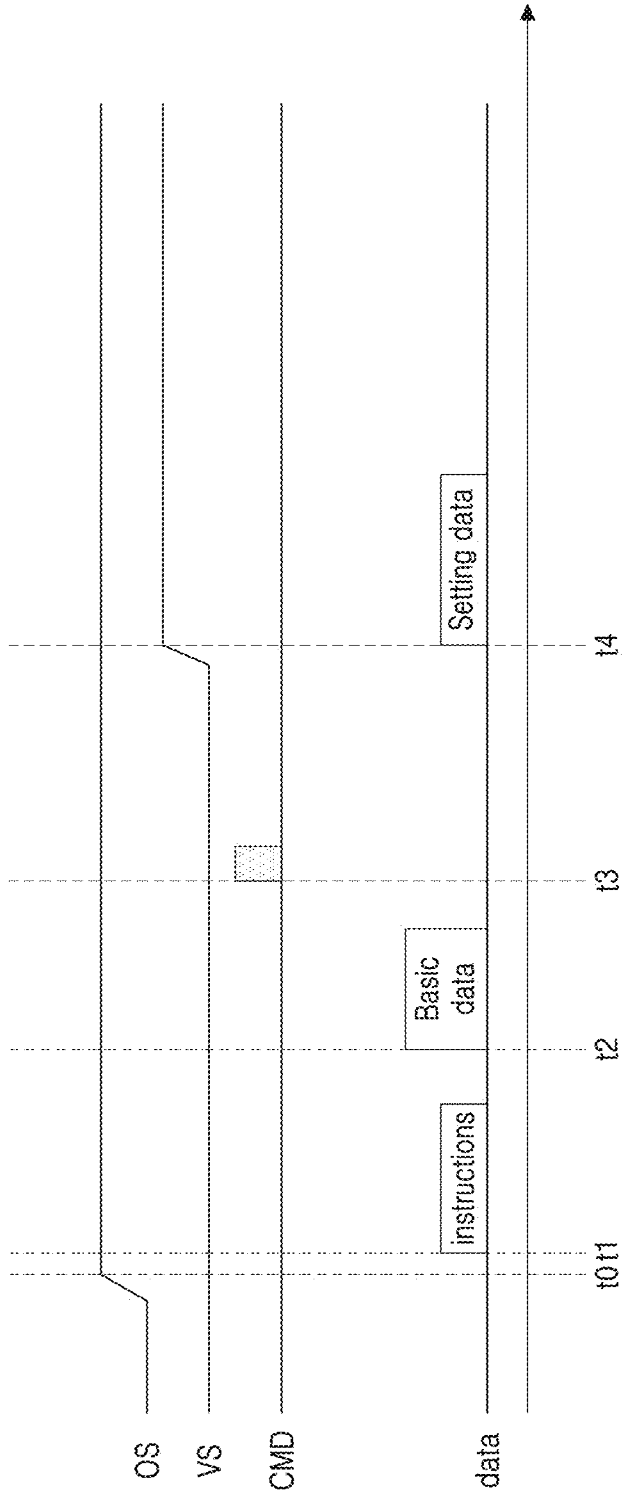
FIG. 11 is a timing chart showing operations of the data and the instructions relative to time when the instructions are loaded, according to some example embodiments of the inventive concepts.

FIG. 11 is a timing chart showing operations of the data and the instructions relative to time when the instructions are loaded, according to some example embodiments of the inventive concepts. The operations in FIG. 11 are substantially the same as the operations in FIG. 9, except that the instructions are loaded prior to the basic data. Thus, the detailed descriptions on the same operations are omitted.

Referring to FIG. 11, when the power signal OS may be received, the revision controller may be operated. The revision controller may determine whether to perform the read operation to the instructions and may determine whether the instructions are normal or not based on the power signal OS. The revision controller may determine whether to read out the instructions based on the logic level change of the power signal OS. In some example embodiments, the revision controller may determine whether to read out the instructions and may determine whether the instructions are normal or not at the first time t1.

When the revision controller determines to perform the read operation to the instructions and determines that the instructions are normal, the drive controller may load the instructions. In some example embodiments, the drive controller may load the instructions after the first time t1.

When electrical power is applied to the display driver circuit, the drive controller may load the basic data stored in the second nonvolatile memory. In some example embodiments, the drive controller may load the basic data, based on the logic level change of the power signal OS. In some example embodiments, the drive controller may load the basic data from the second nonvolatile memory at the second time t2.

Figure 12:
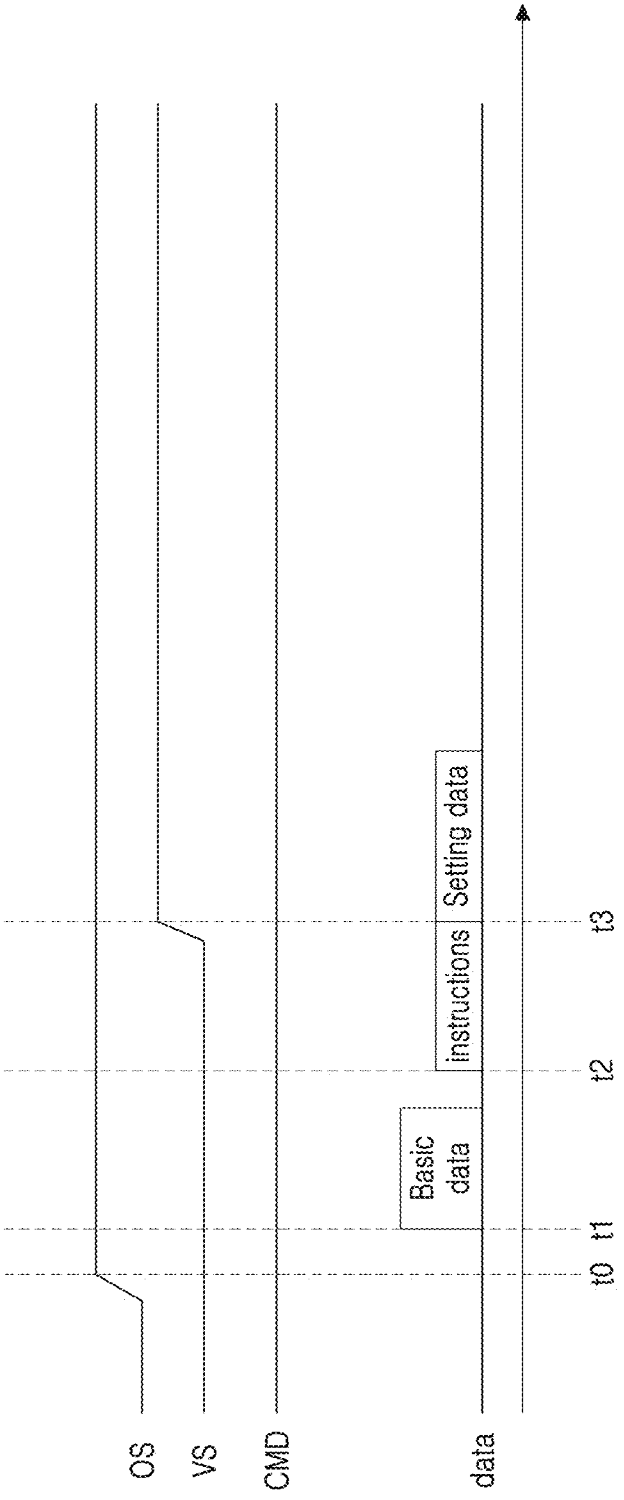
FIG. 12 is a timing chart showing operations of the data and the instructions relative to time when the booting command signals are stored in the first nonvolatile memory, according to some example embodiments of the inventive concepts.

FIG. 12 is a timing chart showing operations of the data and the instructions relative to time when the booting command signals are stored in the first nonvolatile memory, according to some example embodiments of the inventive concepts. The operations in FIG. 12 are substantially the same as the operations in FIG. 9, except that the booting command signals are stored in the first nonvolatile memory. Thus, the detailed descriptions on the same operations are omitted.

Referring to FIG. 12, the drive controller may load the instructions stored in the first nonvolatile memory. The drive controller may read out the instructions stored in the first nonvolatile memory, or may receive the instructions from the revision controller and load the instructions.

The booting command signal may be stored in the first nonvolatile memory. The booting command signal may be stored as the instruction. The booting command signal may include a command signal for requesting that the display driver circuit be booted. When electrical power is applied to the display driver circuit, the drive controller may load the instructions stored in the first nonvolatile memory. The loaded instructions may include the booting command signal. The display panel may initiate the image display as the drive controller loads the booting command signal. The driver controller may control the display panel to display the image data, based on the instructions including the booting command signal.

The logic level of the voltage signal VS may be changed, based on the booting command signal. The display panel may initiate the display operation when the logic level of the voltage signal VS is changed. When the voltage level VS is changed from the low level to the high level, the display panel may display an image. In some example embodiments, the voltage level VS may be changed from the low level to the high level at the third time t3.

When the booting command signal is stored in the first nonvolatile memory as the instruction, the display driver circuit may perform the booting operation without receiving the booting command signal from the host. Accordingly, it may take less time for the display driver circuit to perform the booting operation, and the interface power for data transfer may be reduced between the host and the display driver circuit.

The display system 100, 200 (or other circuitry and sub-circuitry discussed above and in the FIGS., for example, host 120, 210, display driver circuit 130 (or display driver integrated circuit), memory system 170, 230, display panel 140, host interface 131, memory 132, drive controller 133, 222, 310, revision controller 134, 224, display system 200) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts has been particularly shown and described with reference to embodiments thereof, it will be understood that various changes in form and details may be made therein without departing from the spirit and scope of the following claims.

What is claimed is:

1. A display driver circuit, comprising:
an interface configured to receive image data; and
a controller configured to
read out instructions from non-volatile memory before the display driver circuit receives a command from a host, and
control devices driven by the display driver circuit based on at least one of the instructions.

2. The display driver circuit of claim 1, wherein the controller is further configured to:
determine whether or not the instructions are stored in the non-volatile memory; and
read the instructions when the instructions are determined as being stored in the non-volatile memory.

3. The display driver circuit of claim 1, wherein the controller is further configured to:
determine whether or not the instructions are stored in the non-volatile memory; and
stop reading the instructions when the instructions are determined as not being stored in the non-volatile memory.

4. The display driver circuit of claim 2, wherein the controller is further configured to:
determine whether or not the instructions are stored in the non-volatile memory based on comparison between first key data and second key data,
wherein the first key data is stored in the non-volatile memory,
wherein the second key data is preset in the controller.

5. The display driver circuit of claim 4, wherein the controller is further configured to:
determine the instructions as being stored in the non-volatile memory based on the first key data and the second key data matching each other.

6. The display driver circuit of claim 4, wherein the controller is further configured to:
determine the instructions as not being stored in the non-volatile memory based on the first key data and the second key data not matching each other.

7. The display driver circuit of claim 1, wherein the controller is further configured to:
determine whether the instructions read out from the non-volatile memory are normal or abnormal.

8. The display driver circuit of claim 7, wherein the controller is further configured to:
generate a reading checksum calculated from a checksum of the read-out instructions;
compare the reading checksum with a reference checksum stored in the non-volatile memory; and
determine whether the instructions read out from the non-volatile memory are normal or abnormal.

9. The display driver circuit of claim 8, wherein the controller is further configured to:
determine the read-out instructions as being normal based on the reading checksum and the reference checksum matching each other; and control the devices driven by the display driver circuit based-on at least one of the instructions.

10. The display driver circuit of claim 8, wherein the controller is further configured to:

determine the read-out instructions as being abnormal based on the reading checksum and the reference checksum not matching each other; and control the devices driven by the display driver circuit without reflecting the read-out instructions.

11. The display driver circuit of claim 1, wherein the controller is further configured to:

read out the instructions stored in the non-volatile memory and boot the devices based on at least one of the instructions.

12. The display driver circuit of claim 1, wherein the controller is further configured to:

read out setting data stored in the non-volatile memory after reading out the instructions, and set the display driver circuit and the devices.

13. The display driver circuit of claim 1, wherein the controller is further configured to:

read out the instructions from non-volatile memory based on electrical power being applied to the display driver circuit from outside.

14. A display driver circuit, comprising:

a controller configured to generate control signal to control devices driven by the display drive circuit;

the controller being further configured to read out instructions from non-volatile memory, and generate the control signal to revise a physical defect in at least one of the devices, based on at least one of the instructions.

15. The display driver circuit of claim 14, wherein the controller is further configured to:

in determining the instructions are stored in the non-volatile memory, read out the instructions from the non-volatile memory; and generate the control signal based on at least one of the instructions.

16. The display driver circuit of claim 15, wherein the controller is further configured to:

detect an error in the read-out instructions; and generate the control signal based on at least one of the instructions, when no error in the read-out instructions is detected.

17. The display driver circuit of claim 15, wherein the controller is further configured to:

detect an error in the read-out instructions; and generate the control signal excluding the instructions when the error in the reading-out instructions is detected.

18. The display driver circuit of claim 14, wherein the controller is further configured to:

in determining the instructions are not stored in the non-volatile memory, stop reading out the instructions from the non-volatile memory.

19. A method of operating a display driver circuit, the method comprising:

reading out instructions from non-volatile memory before the display driver circuit receives a command from a host; and controlling devices driven by the display driver circuit based on at least one of the instructions.

20. A method of operating a display driver circuit of claim 19, wherein the controlling devices driven by the display driver circuit based on at least one of the instructions, includes:

determining whether the instructions are normal or abnormal; and controlling the devices based on at least one of the instructions, depending on whether the instructions are normal or abnormal.

* * * * *